United States Patent
Roffler

[15] 3,682,140
[45] Aug. 8, 1972

[54] VAPOR GENERATING PLANT

[72] Inventor: Josua Roffler, Winterthur, Switzerland

[73] Assignee: Sulzer Brothers, Ltd., Winterthur, Switzerland

[22] Filed: April 13, 1970

[21] Appl. No.: 27,810

[30] Foreign Application Priority Data

April 15, 1969 Switzerland............5646/69

[52] U.S. Cl..................................122/34, 122/483
[51] Int. Cl.................................................F22b 1/02
[58] Field of Search..............................122/32, 34, 483

[56] References Cited

UNITED STATES PATENTS

| | | | |
|---|---|---|---|
| 2,796,050 | 6/1957 | Rehm | 122/32 |
| 2,220,045 | 10/1950 | Kraft et al. | 122/32 |
| 3,267,907 | 8/1966 | Glausser et al. | 122/34 |
| 3,209,731 | 10/1965 | Schonberger et al. | 122/483 |
| 2,373,564 | 4/1945 | Huff | 122/34 |

*Primary Examiner*—Kenneth W. Sprague
*Attorney*—Kenyon & Kenyon Reilly Carr & Chapin

[57] ABSTRACT

A plurality of vapor generators are connected in common to a single water separator. Collars are used to connect the generators to the separators and the collars can be welded together in the field. The water which is separated out in the separator is returned to the vapor generators and mixed in with the cold feed water.

8 Claims, 1 Drawing Figure

PATENTED AUG 8 1972  3,682,140
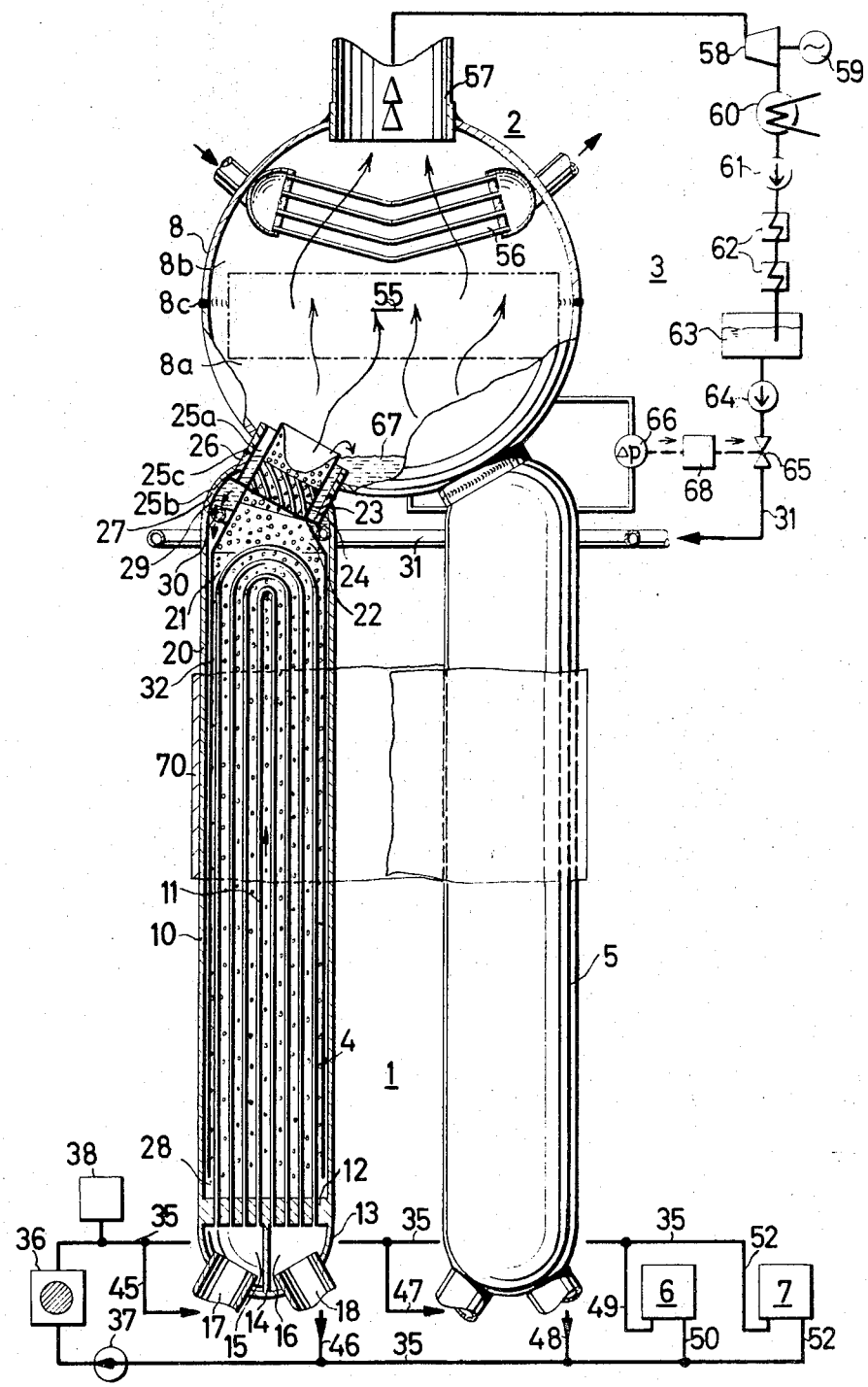
Inventor:
JOSUA ROFFLER
BY
Kenyon & Kenyon Reilly Carr & Chapin
ATTORNEYS

VAPOR GENERATING PLANT

This invention relates to a vapor generating plant and more particularly to a vapor generating plant having a plurality of vapor generating sections.

Vapor generating plants have been known which have a vapor generator and a water separator situated above the generator. However, where the generator has been constructed for high outputs, the tube plate of the generator has been very thick (up to 500 mm) and very large, and therefore very heavy and expensive. Further, in the manufacture of such large tube plates, various operations, for example, the drilling of the very large number of required holes (up to 17,000) takes a very long time.

In order to overcome these disadvantages, the large generators have been replaced by a number of small vapor generators arranged in parallel. The disadvantage of this solution, however, is that it is difficult to provide the space required to house all the water separators connected to the vapor generators. Also, such requires separate heat insulation for the separate vapor generators. Further, the production of a plurality of water separators is troublesome and expensive.

Accordingly, it is an object of the invention to provide a vapor generating plant with a water separating section of relatively small size to service a plurality of vapor generators.

It is another object of the invention to provide a vapor generating plant which can be produced for relative low cost in an economical manner.

It is another object of the invention to provide a structural unit which is light and compact.

It is another object of the invention to enclose the entire vapor-generating section of a vapor generating plant in common thermal insulation.

Briefly, the invention provides a vapor generating plant with a plurality of vapor generators which are connected to a common water separator.

The vapor generators are each constructed so as to generate vapor from a supply of fluid such as water and are all connected in common to the water separator so as to deliver all the generated vapor into the separator. The separator is made, for example, as a spherical vessel and connects to a plurality of the generators, for example, four, by means of collars which can be welded together in a simple operation. In addition, the separator houses liquid or water separating units to separate out water from the vapor as well as a spigot which leads the vapor to a steam circuit. The separator can also have a superheating element mounted therein to supply heat to the vapor before the vapor passes out of the spigot.

The water separator is further connected to the vapor generators so as to direct the separated water back into each generator via the jackets connecting the separator to the generators.

The generators and separator are further surrounded by common thermal insulation and can be connected into various systems such as into the coolant circuits of a nuclear reactor to establish a heat exchange path for the heated coolant passing out of a nuclear reactor.

These and other objects and advantages of the invention will become more apparent from the following detailed description and appended claims taken in conjunction with the accompanying drawing in which:

The FIGURE illustrates a vapor generating plant according to the invention partly in cross-section.

Referring to the FIGURE, the vapor generating plant has a vapor generating section 1, a water separating section 2 and a flow circuit 3 such as a steam circuit for a secondary medium. The vapor generating section comprises four similar vapor generators 4, 5, 6, 7 two of which are shown and two of which are only shown diagrammatically. The water separating section comprises a spherical vessel 8, which is common to all four vapor generators and into which these generators lead.

Each vapor generator 4, 5, 6, 7 has a pressure vessel 10 containing axially arranged heating surfaces, for example, a nest of U-tubes 11, whose ends are fixed in a tube plate 12. A spherical base 13 is welded to the vessel 10 beneath the tube plate 12 and has a partition 14 located in the space between the base 13 and plate 12 to define an inlet chamber 15 and outlet chamber 16 for the primary medium of the vapor generator. The primary medium enters through an inlet spigot 17 on the spherical base 13 passes upwardly in the tubes 11 and then downwardly into the outlet chamber 16 and leaves through an outlet spigot 18.

In addition, a lining tube 21 is mounted in each vessel 10 by suitable means (not shown), e.g., by brackets on the pressure vessel wall 20, between the nest of tubes 11 and the wall 20 of the pressure vessel. This lining tube 21 extends upwardly into the spherical separator vessel 8 by means of an extension which comprises a conical portion 22 and a cylindrical portion 24 in which a twist-type water separator 23 is mounted. The cylindrical portion 24 of the lining tube extension is surrounded in spaced relation by a jacket 25 to define an annular gap 26 therebetween. The jacket 25 is formed by a collar 25a attached to the spherical vessel 8 and a collar 25b attached to an upper spherical portion 27 of the pressure vessel 18 and the two collars 25a, 25b are welded together at 25c. The lining tube 21 extends downwards to a certain distance above the tube plate 12 in order to leave a gap 28. An annular chamber 29 which is formed between the spherical portion 27 of the pressure vessel 10 and the conical portion 22 of the tube lining 21 contains a perforated feedwater distributing ring 30 connected to a feed-water line 31 of the secondary medium circuit 3.

All four vapor generators are connected in parallel to the feed-water line 31. The cold feed water falls out of the annular chamber 29 into an annular gap 32 between the lining tube 21 and pressure-vessel wall 20, passing at the bottom through the gap 28 into the zone occupied by the nest of tubes 11. Each vapor generator is connected in parallel to a coolant circuit 35 for a nuclear reactor 36. The coolant, here pressurized water, is supplied by a pump 37. The circuit contains a pressure-maintaining means 38 for the coolant. As shown, one generator 4 is connected to the coolant circuit by branch lines 45 and 46, another generator 5 by branch lines 47 and 48 and the remaining generators 6 and 7 communicate with the coolant circuit in a similar manner by way of branch lines, 49, 50 and 51, 52 respectively.

The spherical vessel 8, which is in two halves 8a and 8b contains water separating elements 55 and a superheater 56. The dry steam, which is the secondary medium, leaves through a live-steam spigot 57 in the top of the vessel 8 and enters the circuit 3 for the secondary medium. This circuit 3 contains a turbine 58 with an electric generator 59, a condenser 50, a condensate pump 61, two preheaters 62, a feed-water vessel 63, a feed-water pump 64 and a feed-water valve 65. A pressure converter 66 generates a signal corresponding to the water level 67 in the spherical vessel 8 and used by a controller 63 to control the feed-water valve 65 in the feed-water line 31.

The operation of the plant will be described with reference to generator 4 for purposes of simplicity.

The coolant for the nuclear reactor 36, that is, the primary or heating medium for the vapor generators, flows out of the circuit 35 by way of the branch line 45 and the inlet spigot 17 of the vapor generator 4 into the inlet chamber 15 of this generator. Next, the medium spreads through the approximately 2,000 parallel tubes in the nest 11 in heat exchange relation with the upward flow of secondary medium (water) surrounding the tubes. The primary medium leaving the nest of tubes collects in the outlet chamber 16 and flows by way of the outlet spigot 18 and branch line 46 back into the nuclear reactor circuit 35. The secondary medium surrounding the tubes in the nest is heated and partially evaporated. The bubbles of steam reduce the specific gravity of the water, causing a strong upward flow in the water. The water/steam mixture passes through the upper portions 22, 24 of the lining and is caused to rotate in the twist-type water separator 23, so that coarse separation of the water and steam occur due to centrifugal action. The separated water collects in the bottom of the spherical vessel 8. The steam, which still contains a large proportion of water, flows on to the water separator elements 55, where all but a negligible proportion of the water is separated. This water, also, collects in the bottom of the spherical vessel 8, where a water reserve forms, whose level is indicated at 67 and which communicates through the annular gap 26 with the water in the annular gap 32 in the pressure vessel and mixes therein with the cold feed water. Since water is yielded in only one water separator, its level can easily be regulated by means of the single controller 68. The steam flows through the superheater 56 to the live-steam spigot 57 and then into the circuit 3. The steam expanded in the turbine 58 is condensed in the condenser 60. The condenser pump 61 then feeds the secondary medium through the preheaters 62 into the feed-water vessel 63 and then the secondary medium is fed by the pump 64 to the feed-water line 31 for the vapor generators.

The vapor generating section of the plant therefore comprises four similar vapor generators 4 to 7, which can be completed separately in a factory. The lower hemisphere 8a of the spherical vessel is provided with four collars 25a. In order to build the plant, the four vapor generators are erected on site, and the lower hemisphere is then put on with the collars 25a on the vapor-generator collars 25b, whereupon the collars are welded together at 25c. The water separator elements and superheaters are then mounted in the respective hemisphere of the spherical vessel 8, and the hemispheres are welded together at 8c. The plant, therefore, is easily and rapidly assembled. Little welding is carried out on site, and only annular welds are required. The four vapor generators are then enclosed over their entire length in common thermal insulation 70 (only part of which is shown). The spherical vessel may also be enclosed in this insulation.

What is claimed is:

1. A vapor generating plant comprising
   a vapor generating section having a plurality of pressure vessels for generating vapor therein, each pressure vessel having a plurality of tubes therein for passing a primary medium therethrough in heat exchange relation with a secondary medium passing into said pressure vessel to generate the vapor from the secondary medium;
   a water separating section having a separating vessel therein connected in common to said pressure vessels to receive the generated vapor therefrom; and
   a lining surrounding said tubes in each pressure vessel, said lining having an extension thereof extending into said separating vessel to direct the generated vapor into said separating vessel.

2. A vapor generating plant as set forth in claim 1 wherein said separating vessel is connected to said pressure vessels to return separated water from the generated vapor passing therethrough to said pressure vessels.

3. A vapor generating plant as set forth in claim 2 which further comprises means connected to each pressure vessel to direct a flow of fresh feed water into each pressure vessel, and means for measuring the level of separated water in said separating vessel to control the flow of fresh feed water into each pressure vessel in dependence upon the level of separated water in said separating vessel.

4. A vapor generating plant as set forth in claim 1 wherein said separating vessel is spherical and wherein said water separating section further includes a water separating element and a superheating element therein in the path of flow of the vapor passing therethrough.

5. A vapor generating plant as set forth in claim 1 which further includes a jacket disposed in spaced relation to said lining extension to define an annular gap therebetween for directing collected liquid in said separating vessel back into each pressure vessel.

6. A vapor generating plant as set forth in claim 1 which further includes means in said lining extension for producing a twist in the flow of vapor passing into said separating vessel.

7. A vapor generating plant as set forth in claim 1 wherein each said pressure vessel has a wall spaced from said lining to define an annular space for the flow of secondary medium into said pressure vessel and an inlet for fresh secondary medium communicating with said annular space.

8. A vapor generating plant as set forth in claim 1 which further comprises thermal insulation surrounding said pressure vessels in common.

* * * * *